United States Patent

Van Craaikamp et al.

[11] Patent Number: 5,810,653
[45] Date of Patent: Sep. 22, 1998

[54] METHOD AND APPARATUS FOR DEBONING A LEG OF SLAUGHTERED POULTRY

[75] Inventors: Jacob Jan Van Craaikamp; Johan Hendrik Anton Klukhun, both of Oostzaan, Netherlands

[73] Assignee: Machinefabriek Meyn B.V., Oostzaan, Netherlands

[21] Appl. No.: 838,244

[22] Filed: Apr. 17, 1997

[30] Foreign Application Priority Data

Apr. 17, 1996 [NL] Netherlands ............................ 1002881

[51] Int. Cl.$^6$ .................................................. A23C 17/04
[52] U.S. Cl. ............................................................ 452/136
[58] Field of Search ..................... 452/136, 138, 452/135

[56] References Cited

U.S. PATENT DOCUMENTS

| | | | |
|---|---|---|---|
| 4,216,565 | 8/1980 | Volk et al. | 452/136 |
| 4,377,884 | 3/1983 | Viscolosi | 452/138 |
| 4,380,849 | 4/1983 | Adkison et al. | 452/136 |
| 4,488,332 | 12/1984 | Atteck et al. . | |
| 4,669,150 | 6/1987 | Manmoto et al. | 452/136 |
| 4,811,456 | 3/1989 | Heuvel | 452/136 |
| 4,944,067 | 7/1990 | Kulishev et al. . | |
| 5,030,163 | 7/1991 | Mielnik | 452/136 |
| 5,064,403 | 11/1991 | Elsten | 452/135 |
| 5,090,940 | 2/1992 | Adkison | 452/136 |
| 5,173,076 | 12/1992 | Hazenbroek . | |
| 5,277,649 | 1/1994 | Adkison . | |

FOREIGN PATENT DOCUMENTS

| | | |
|---|---|---|
| 0362457A1 | 4/1990 | European Pat. Off. . |
| 0465258A1 | 1/1992 | European Pat. Off. . |
| 4320241A1 | 12/1994 | Germany . |
| 29603797 | 5/1996 | Germany . |
| 9403070 | 2/1994 | WIPO . |

OTHER PUBLICATIONS

Dutch Search Report, Dec. 16, 1996.
Co–Pending U.S. Patent Application Ser. No. 08/839,084.
Dutch Search Report, Dec. 16, 1996—From Co–Pending '084 Application.
EPO Search Report, Jul. 30, 1997.

Primary Examiner—Willis Little
Attorney, Agent, or Firm—Dority & Manning

[57] ABSTRACT

The invention relates to a method for deboning a leg of slaughtered poultry. The leg is firstly stretched and next, starting from a forward end of the leg, the meat is stripped from the leg towards the rearward end of the leg. An apparatus for carrying out said method comprises means for stretching the leg, a stripping diaphragm and driving means for moving the leg through the diaphragm.

11 Claims, 3 Drawing Sheets

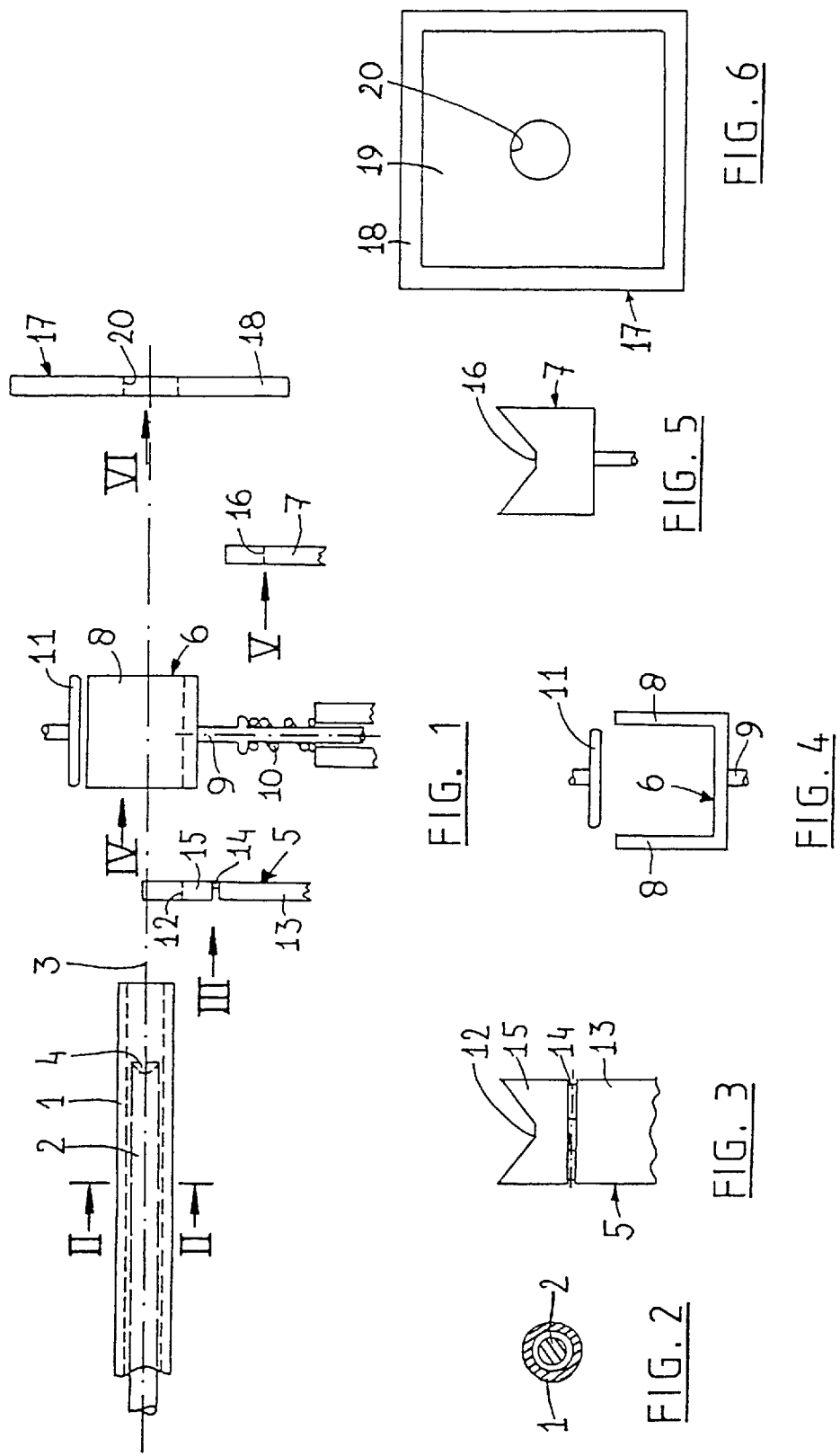

METHOD AND APPARATUS FOR DEBONING A LEG OF SLAUGHTERED POULTRY

BACKGROUND OF THE INVENTION

The invention firstly relates to a method for deboning a leg of slaughtered poultry comprising an upper leg and lower leg.

A method of this type is described in European patent application 362.457. According to this known method, the meat is cut loose starting from both ends of the leg towards the knee joint.

OBJECTS AND SUMMARY OF THE INVENTION

It is an object of the invention to provide a method and apparatus of said type, by which improved results can be obtained. Additional objects and advantages of the invention will be set forth in part in the following description, or may be obvious from the description, or may be learned through practice of the invention.

Thus the method according to the invention is characterized by stretching the leg and stripping the meat from the leg, starting from a forward end of the leg towards the other or rearward end of the leg.

Because in correspondence with the method according to the invention, the leg is stretched and the meat is fully stripped from the leg, starting from one end towards the other end, the meat is considerably less damaged compared to the known prior methods. As a result, an end product is obtained which is more attractive and thus commercially more valuable.

Further, using the method according to the invention a higher yield may be obtained. This yield may still further be increased when, in correspondence with a preferred embodiment of the method according to the invention, the stripping occurs by moving the leg through a stripping diaphragm.

In this respect, it is noted that it is basically known to provide a stripping diaphragm for obtaining a separation between bone and meat, but then always only a part of a member, for example only the lower leg or only the upper leg, is processed.

Further, it is advantageous when the leg is pushed through the stripping diaphragm. In this manner, stripping the meat can already occur fully from the forward end of the leg.

Further, it appears advantageous that, previously to deboning, the knuckle at the rearward end of the leg is removed.

By removing this knuckle, the meat can be stripped down from the respective bone more easily, without the contents of the bone (the marrow) being subject to forces that so large that substances from the marrow are pressed outwardly which would lead to a degeneration of the meat.

Further, the invention relates to an apparatus for carrying out the method according to the invention. Such an apparatus is known from European patent application 362.457. Further devices are known using a part of a leg, for example the upper leg or the lower leg can be deboned (see Dutch patent application 87.00213). The invention aims at offering an improved apparatus over the state of the art.

The apparatus according to the invention is characterized by means for stretching the leg, a stripping diaphragm, and driving means for moving the leg through the diaphragm. The advantages to be obtained with such an apparatus essentially have been discussed before already in respect of the method according to the invention.

According to a preferred embodiment of the apparatus, the driving means comprises pusher means engaging the rearward end of the leg. In this aspect, it further is preferred that the pusher means comprise a hollow tube at least partially receiving the rearward end of the leg. Using said hollow tube, a stable engagement of the respective rearward end of the leg (especially the bone) is obtained, such that next the leg can be pushed through the diaphragm in a controlled manner, while not being able to collapse sidewardly.

For optimizing the stable engagement of the hollow tube onto the leg, it further is possible that the hollow tube is dimensioned such as to receive therein the leg up to its knee joint.

According to a advantageous embodiment in the hollow tube, a coaxial expelling rod is provided movable relative thereto, which can engage the rearward end of the leg. Using said expelling rod, the leg after being moved through the diaphragm can be pushed out of the hollow tube while being prevented like this, that unwantedly the leg is pulled back through the diaphragm together with the hollow tube.

Further, an embodiment of the apparatus is mentioned wherein the stretching means comprises a central positioning means which can engage the leg at the knee joint and two auxiliary positioning means engaging the upper leg and lower leg positioned in front of the central positioning means and behind it, respectively, said auxiliary positioning means substantially being positioned in the same plane and being moveable between a position in which their position substantially corresponds with the natural flexed position of the leg and a position in which they are substantially aligned in said plane. In the position in which the positioning means are substantially aligned in said plane, the upper leg and lower leg substantially will be aligned, such that the leg is stretched and can be moved through the diaphragm in an optimal manner.

The operation of the mentioned embodiment of the apparatus can be optimized further when the positioning means are positioned in a vertical plane and that one of the auxiliary positioning means and the central positioning means are positioned at substantially the same level and wherein the other auxiliary positioning means is movable upward and downward between a lower level and said level.

In the position in which the auxiliary positioning means movable upward and downward is positioned at its lower level, a leg positioned in its natural flexed position always will assume the same defined position under influence of the force of gravity, in which position all three positioning means are engaged. Like this, always the same starting position is obtained, which is a large advantage when deboning a leg in automated manner.

Further, it is advantageous when the central positioning means cooperates with a restricting plate movable relative thereto which can push the knee joint onto the central positioning means. Like this, it is avoided that when the three positioning means are aligned, the leg is lifted without being stretched.

Further, an embodiment of the apparatus is mentioned in which a central positioning means is movable in a spring-loaded manner. Such a spring-loaded movement enables an adaption of the position of the central positioning means with respect to the dimensions of the leg to be processed.

Finally, the possibility is mentioned that the diaphragm is movable to and fro in the direction of the driving means.

Particularly, the advantage of such an embodiment appears when the driving means include said hollow tube. When said hollow tube has received the rearward end of the leg and the diaphragm has received the forward end of the leg the stretching means can be disengaged without the leg again assuming a flexed position. Next the leg can be pushed through the diaphragm without the stretching means hindering this operation.

It is noted that the movements of the parts of the apparatus can be obtained by means of follower-curved tracts assemblies known per se. Further, some of the apparatus according to the invention can be combined for obtaining a carousel-like device in which simultaneously a large number of legs can be processed.

Hereinafter the inventions will be elucidated referring to the drawing, in which an embodiment of the apparatus according to the invention is represented.

BRIEF DESCRIPTION OF THE DRAWINGS

FIG. 1 shows schematically, an embodiment of the apparatus according to the invention in a side-elevational view, in an arbitrary position, FIG. 2 shows a section according to II—II in FIG. 1;

FIG. 3 shows a view according to III in FIG. 1;

FIG. 4 shows a view according to the IV in FIG. 1;

FIG. 5 shows a view according to the V in FIG. 1;

FIG. 6 shows a view according to the VI in FIG. 1; and

DETAILED DESCRIPTION OF THE PREFERRED EMBODIMENTS

Figure 7A:
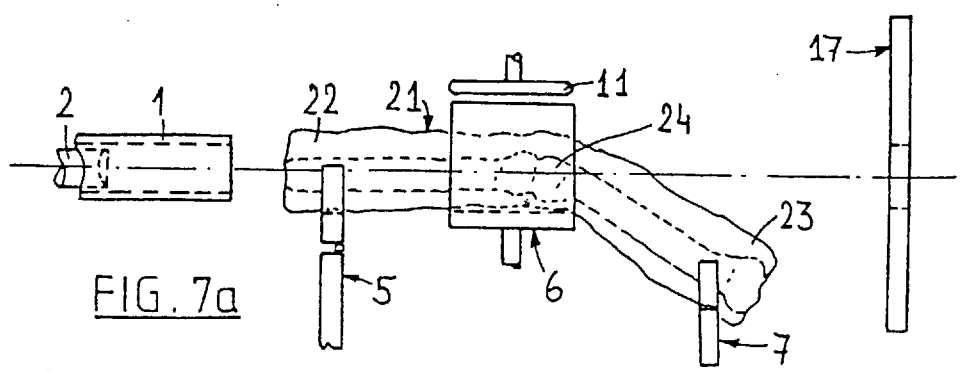
FIG. 7 shows the apparatus represented in FIG. 1 during a number of successive stages while carrying out the method according to the invention.

Reference will now be made in detail to one or more presently preferred embodiments of the invention, examples of which are illustrated in the drawings. Each example is provided by way of explanation of the invention, and not meant as a limitation of the invention. For example, features illustrated or described as part of one embodiment can be used in another embodiment to yield still a further embodiment. It is extended that the present invention cover such modifications and variations.

Before starting with a detailed description of the apparatus schematically represented in FIG. 1, the following is noted. As far as beng movable, the parts of the apparatus are driven by driving mechanisms not shown in detail. A number of different constructive solutions are available for this; by way of example, the provision of cooperating followers and curved tracks is mentioned. As is further common in apparatus for processing slaughtered poultry, a number of the apparatus to be described can be combined in a carousel-like device carrying at its circumference the operational apparatus described for carrying out the invention.

For the sake of clarity, hereinafter only those parts of the apparatus are illustrated which are essential for a direct understanding of the invention.

The apparatus shown in a side-elevational view in FIG. 1 for deboning a leg of slaughtered poultry comprises driving means shown left, including a hollow tube 1 and expelling rod 2 coaxially therein. The hollow tube 1 and expelling rod 2 are independently movable to and fro in the direction of the center line 3. The expelling rod 2 comprises at its forward end a recess 4.

In FIG. 2 a section according to II—II through the hollow tube 1 and through the expelling rod 2 is illustrated.

At the right hand of the driver means 1 and 2, positioning means 5, 6 and 7 are provided. These include firstly a central positioning means 6 which, as shown also in the view according to FIG. 4, includes an uppermost positioning gutter 8 and a rod 9 carrying said gutter 8. The central positioning means 6 can move upward and downward in a limited manner against the spring-load of a spring 10.

Above the central positioning means 6 a restricting plate 11 is provided which also can move upward and downward and which in a way to be described later can cooperate with the central positioning means 6.

The auxiliary positioning means 5 positioned in front of the central positioning means 6 comprises at its upper side a V-shaped recess 12 (see FIG. 3). For a reason to be explained later, the auxiliary positioning means 5 preferably includes a lowermost stationary part 13 and an uppermost part 15 pivotable around a pivot axis 14.

Behind the central positioning means 6, the second auxiliary positioning means 7 is provided which, as shown in FIG. 5, comprises at its upper side also a V-shaped recess 16. This second auxiliary positioning means 7 is mounted movably upward and downward in the apparatus.

Further, the essential parts of the apparatus include a stripping diaphragm 17. As schematically represented in the view according to FIG. 6, this includes a mounting frame 18 and a membrane 19 from flexible material mounted therein having a central opening 20. The stripping diaphragm 17 is journalled movably to and fro in the apparatus along centerline 3.

Next the operation of the apparatus, and thus the method according to the invention, will be elucidated referring to FIG. 7, in which the apparatus illustrated in FIG. 1 is shown, again extremely schematically, in a number of successive positions.

FIG. 7a shows the starting position. The driving means, including hollow tube 1 and expelling rod 2, are positioned at some distance to the left of the positioning means 5–7. The restricting plate 11 is positioned at some distance above the central positioning means 6. In the position illustrated, the central positioning means 6 and the first auxiliary positioning means 5 are substantially at the same level, whereas the other auxiliary positioning means 7 is positioned at a lower level. However, said three positioning means 5–7 are positioned in the same plane, in the embodiment shown on a vertical plane. Because the right-hand auxiliary positioning means 7 is positioned at a lower level, a leg 21, substantially including lower leg 22, upper leg 23 and knee joint 24, positioned onto the positioning means will also be positioned in the same orientation. This orientation corresponds with the natural, somewhat flexed position of the leg 21.

It is to be noted however, that lover leg 22 and upper leg 23 can change places.

The stripping diaphragm 17 is positioned at some distance from the positioning means.

Figure 7B:
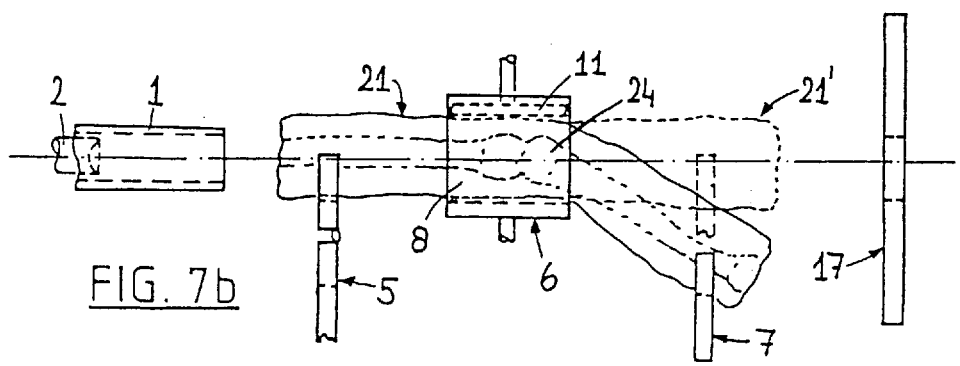

For stretching the leg, firstly the restricting plate 11 is moved downward until it pushes the leg 21 at the knee joint 24 against the positioning gutter 8 of the central positioning means 6. This situation is represented in FIG. 7b. Further, the right-hand auxiliary positioning means is moved upward then from the position 7 indicated in full lines in FIG. 7b towards the position 7' indicated in dotted lines in FIG. 7b. In the latter position, the leg is stretched (dotted position 21').

Figure 7C:
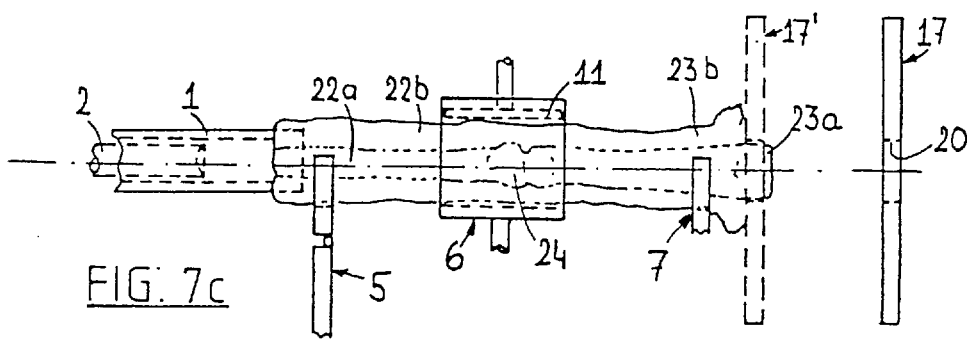

Next, see FIG. 7c, the hollow tube 1, together with the expelling rod 2, is moved to the right such that the end of the hollow tube 1 will engage between the bone 22a and the surrounding meat 22b of the lower leg 22. Basically, it is possible that the hollow tube 1 slides forward over the bone 22a until the foremost end of the hollow tube 1 engages the knee joint 24. Further, the diaphragm is moved from position 17, represented in full lines in FIG. 7c, towards position 17', represented in dotted lines, in which position the foremost end of the bone 23a of the upper leg 23 is already partially received in the opening 20 in the membrane 19 (see FIG. 6).

Now stripping the meat 23b from the bone 23a of the upper leg 23 has already been started.

In the situation illustrated in FIG. 7c in which the hollow tube 1 has at least partially received the lower leg 22 (specifically bone 22a) and in which the upper leg 23 has already partially passed the opening 20 in the stripping diaphragm 17, the leg 21 principally is secured against undesired movements, such as buckling sidewardly. Thus the positioning means at least partly can be disengaged. For this reason, in the illustrated embodiment of the apparatus according to the invention, the second auxiliary positioning means 7 is moved downward until it disengages the leg. In this position (see FIG. 7d), the hollow tube 1 and the expelling rod 2 are together pushed further to the right, whereby the bone of the upper leg 23a and next the bone of the lower leg 22a are pushed through the opening 20 of the stripping diaphragm 17. Like this, the meat 22b and 23b is stripped from the bones 22a and 23a.

Figure 7D:
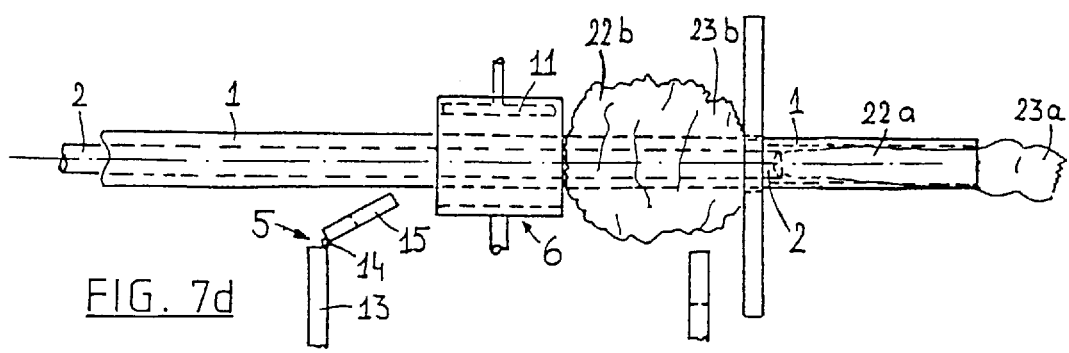
Figure 7E:
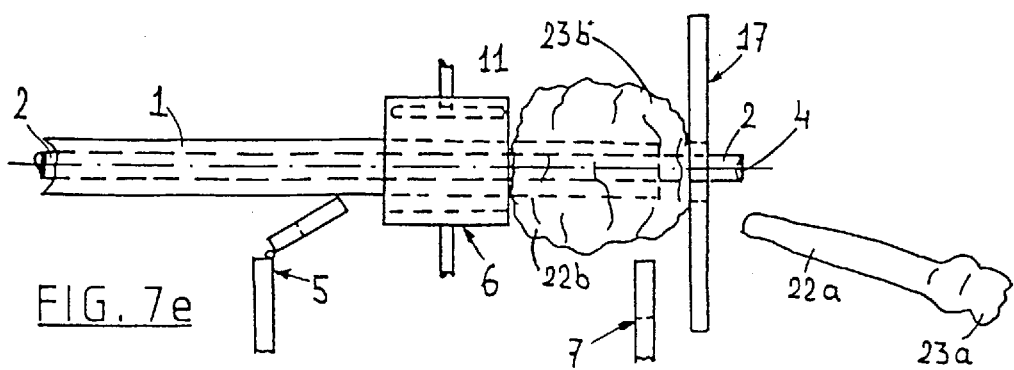

In FIG. 7d, it is further illustrated that the uppermost part 15 of the first auxiliary positioning means 5 has been pivoted around the pivot auxiliary positioning means 5 has been pivoted around the pivot axis 14 relative to the lowermost part 13, for enabling the hollow tube 1 to pass. It would be possible also to move downward the first auxiliary positioning means 5, just like the second auxiliary positioning means 7.

After the meat has been stripped fully from the leg in the described manner, firstly the hollow tube 1 is moved back to the left, whereas the expelling rod 2 stays stationary. As a result, the recess 4 of the expelling rod 2 engages the bone 22a and the bones 22a and 23a are driven out of the hollow tube 1 and fall down in a discharge gutter not illustrated. After the expelling rod 2 has been retracted to the left also, the stripped meat 22b and 23b can be removed in a way not shown further.

For assuring a proper operation of the apparatus, it might be necessary that the knuckle at the end of the lower leg 22 is removed before the leg is processed in the manner described above. Further, it can be of advantage to cut the meat entirely in the longitudinal direction of the leg, such that after stripping not a meat collar, but a planar piece of meat is obtained.

The invention is not limited to the embodiment described before, which can be varied widely within the scope of the invention as defined by the claims.

We claim:

1. An apparatus for automated deboning of a leg of slaughtered poultry, wherein the leg includes an upper leg bone and a lower leg bone with attached meat and a knee joint connecting the upper and lower leg bones, said apparatus comprising:

a straightening mechanism configured to engage and straighten said leg, said straightening mechanism comprising a central positioning device engaging said leg at said knee joint and at least two auxiliary positioning devices disposed to engage said upper and lower leg bones respectively, any combination of said central and auxiliary positioning devices movable to straighten said leg;

a stripping diaphragm with a hole defined therein disposed at one end of said straightening mechanism to strip meat from said upper and lower leg bones as they are pushed through said hole; and a pushing device disposed generally opposite said stripping diaphragm at the opposite end of said straightening mechanism, said pushing device comprising a movable rod device with an end configured for engaging an end of one of said upper or lower leg bones once said leg has been straightened by said straightening mechanism, said rod device pushing the straightened leg bones through said auxiliary and central positioning devices and said stripping diaphragm wherein the leg bones are pushed completely through said hole in said stripping diaphragm from one end of said leg to an opposite end of said leg.

2. The apparatus as in claim 1, wherein said pushing device further comprises a generally hollow tube surrounding said pushing rod and movable relative thereto, said hollow tube having a forward end sized to engage one end of said leg generally between said meat and bone and generally movable up to said knee joint.

3. The apparatus as in claim 1, wherein any combination of said central and auxiliary positioning devices are movable in a plane such that said devices assume a first position corresponding to a natural flexed configuration of said leg and a second straightening position wherein said central and auxiliary positioning devices are generally aligned in said plane and hold said leg in a straightened configuration so that the entire said leg can be pushed through said stripping diaphragm.

4. The apparatus as in claim 3, wherein at least one of said central and auxiliary positioning devices are movable in a vertical plane wherein in said first position one of said auxiliary positioning devices and said central positioning device are aligned at substantially the same level in said vertical plane, and said other auxiliary positioning device is movable upward and downward from said first position to said straightening position.

5. The apparatus as in claim 3, wherein said central positioning device comprises a movable restricting plate to engage and straighten said knee joint.

6. The apparatus as in claim 1, wherein said stripping diaphragm is movable towards and away from said pushing device.

7. An apparatus for automated deboning of a leg of slaughtered poultry, wherein the leg includes an upper leg bone and a lower leg bone with attached meat and a knee joint connecting the upper and lower leg bones, said apparatus comprising:

a straightening mechanism configured to engage and straighten said leg, said straightening mechanism comprising a central positioning device engaging said leg at said knee joint and at least two auxiliary positioning devices disposed to engage said upper and lower leg bones respectively, any combination of said central and auxiliary positioning devices movable so that said devices are configurable between a first position corresponding to a natural flexed poultry leg, and a straightening positioning wherein they engage and hold said leg in a straightened condition;

a stripping diaphragm with a hole defined therein disposed at one end of said straightening mechanism to receive one of said upper or lower leg bones and to strip meat from both said upper and lower leg bones as they are pushed through said hole in a straightened position; and a pushing device disposed generally opposite said stripping diaphragm at the opposite end of said straightening mechanism, said pushing device comprising a movable rod device with an end configured for engaging an end of said leg opposite said stripping diaphragm once said leg has been straightened by said straightening mechanism, said rod device pushing the straightened leg bones through said central and auxiliary positioning devices and said stripping diaphragm so that the leg bones are pushed completely through said hole in said stripping diaphragm from one end of said leg to an opposite end of said leg; and said pushing device further comprising a generally hollow tube member movable relative to said rod device and said stripping diaphragm, said tube member having a forward said end of said leg adjacent said rod device between aid meat and bone and movable generally up to said knee joint.

8. An automated process for deboning a leg of a slaughtered poultry, wherein the leg includes upper and lower leg bones with attached meat and a knee joint connecting the leg bones, said process comprising the steps of:

supporting and straightening the leg with automated auxiliary positioning devices engaging the leg bones and a central positioning device engaging the knee joint so that the leg bones are generally straight and aligned;

engaging one end of the straightened leg with a movable pushing device; and pushing the straightened leg through the auxiliary and central positioning devices and a hole in a stripping diaphragm so that the entire leg is pushed completely through the stripping diaphragm in one direction with the meat being stripped from the leg bones by the stripping diaphragm.

9. The process as in claim 8, further comprising engaging the straightened leg with a hollow movable member at the same end of the leg engaged by the pushing device, and sliding the hollow member between the leg bones and meat generally up to the knee joint.

10. The process as in claim 8, wherein said supporting and straightening step comprises engaging the leg at least at the knee joint and the upper and lower leg bones with any combination of the positioning devices and moving the leg from a natural flexed condition to the straightened position.

11. The process as in claim 10, further comprising receiving the leg in its natural flexed condition in said positioning devices and subsequently automatically moving said positioning devices into a configuration wherein said leg is held and straightened by said positioning devices.

* * * * *